Sept. 5, 1944.   C. W. JACKMAN   2,357,515
BEARING FILLET ROLLER
Filed Sept. 2, 1942   5 Sheets-Sheet 1

Inventor
Charles W. Jackman
By Blackmore, Spencer & Flint
Attorneys

Sept. 5, 1944. C. W. JACKMAN 2,357,515
BEARING FILLET ROLLER
Filed Sept. 2, 1942 5 Sheets-Sheet 2
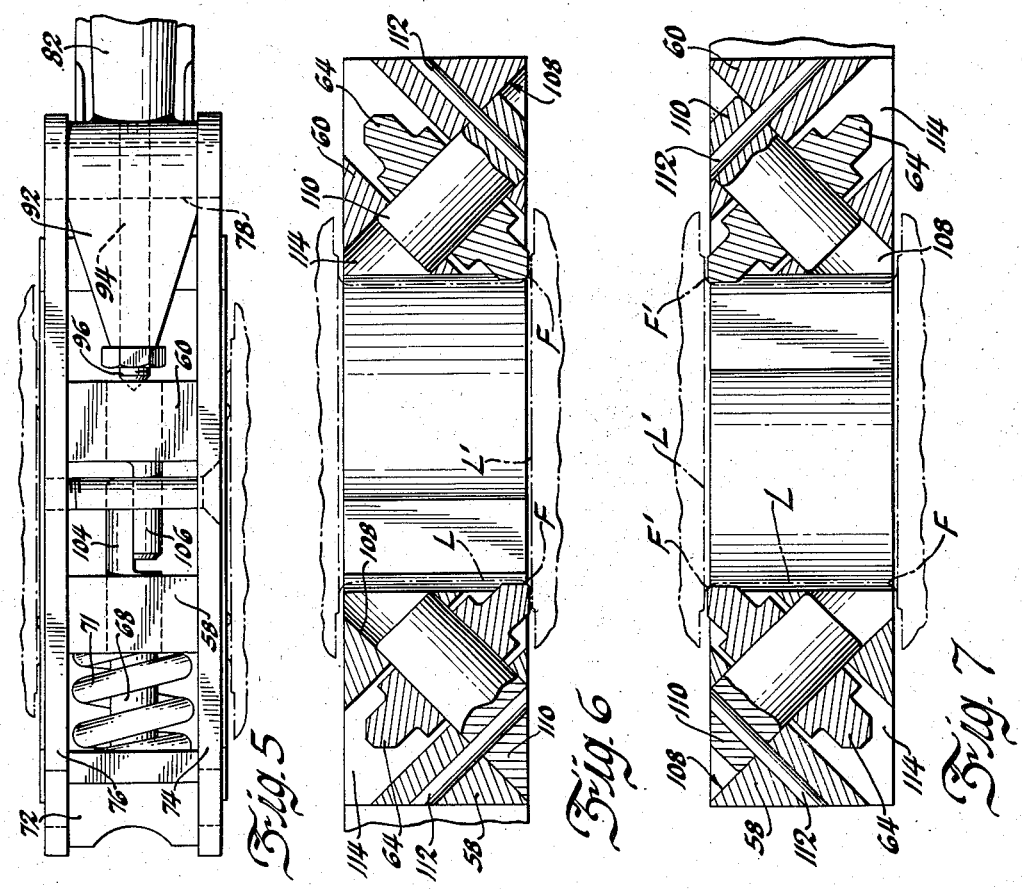
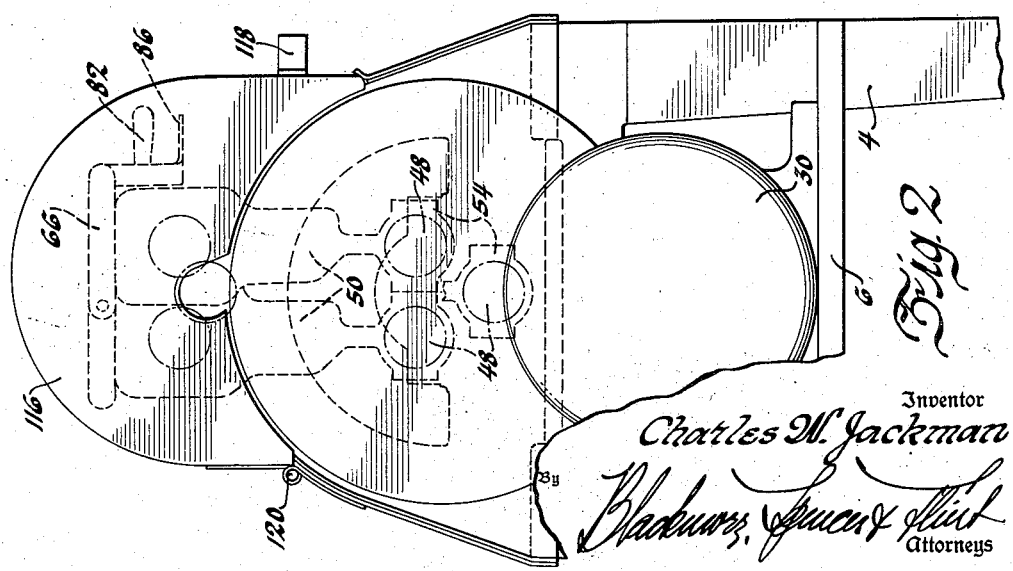
Inventor
Charles W. Jackman
By
Attorneys Sept. 5, 1944.  C. W. JACKMAN  2,357,515
BEARING FILLET ROLLER
Filed Sept. 2, 1942  5 Sheets-Sheet 3
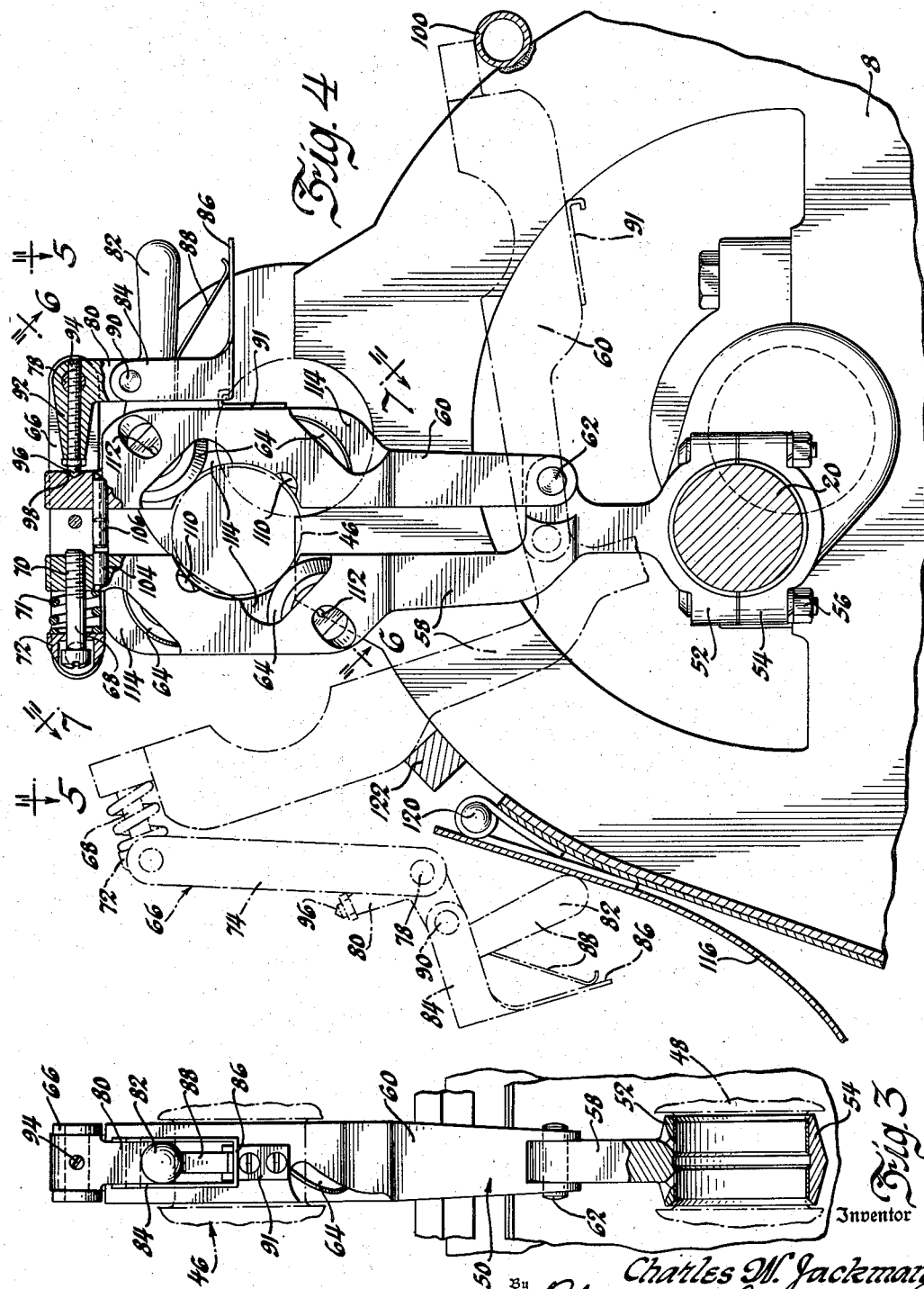
Inventor
Charles W. Jackman
By
Blackmore, Spencer & Hunt
Attorneys

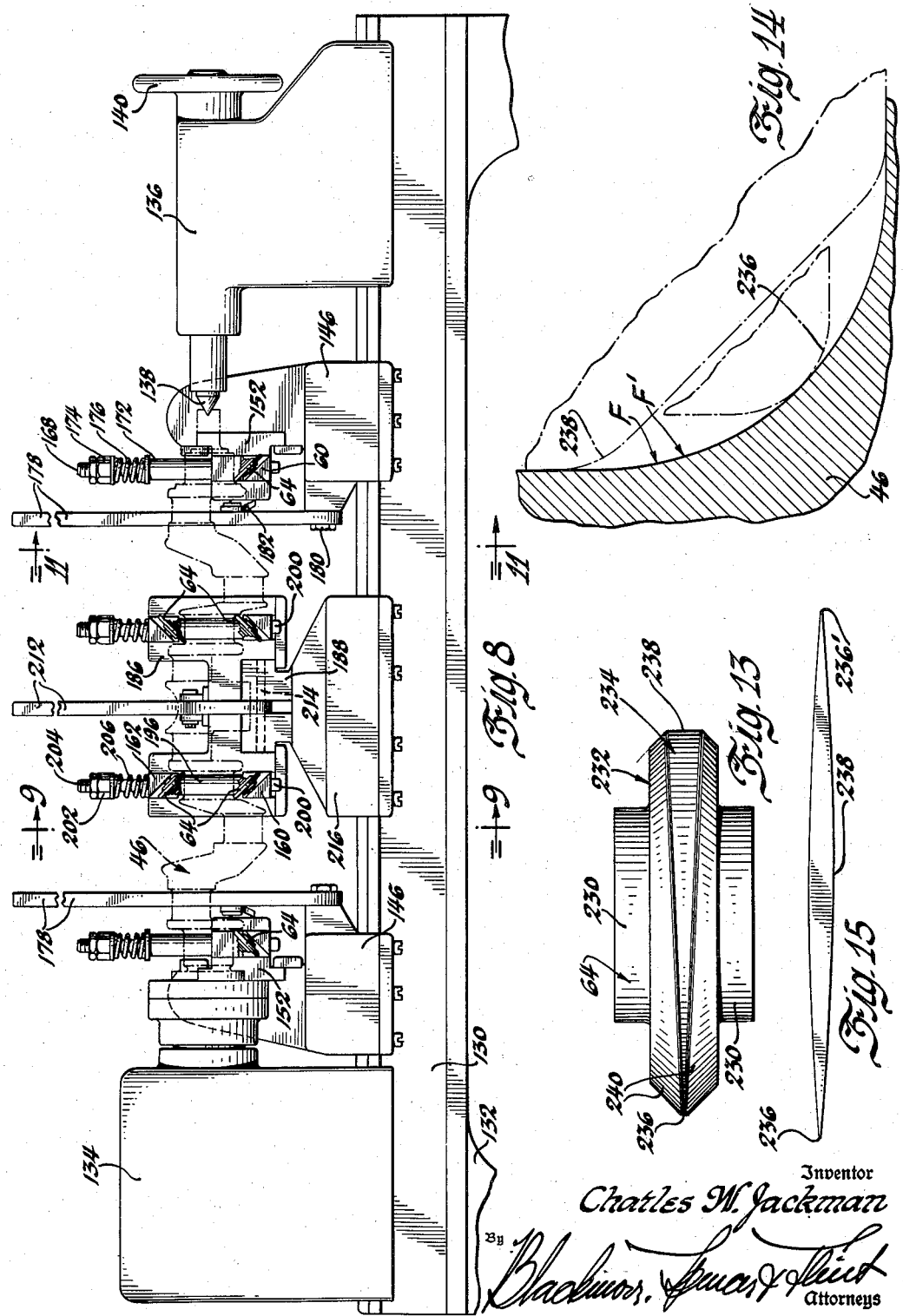
Sept. 5, 1944. C. W. JACKMAN 2,357,515
BEARING FILLET ROLLER
Filed Sept. 2, 1942 5 Sheets-Sheet 4
Inventor
Charles W. Jackman
Attorneys

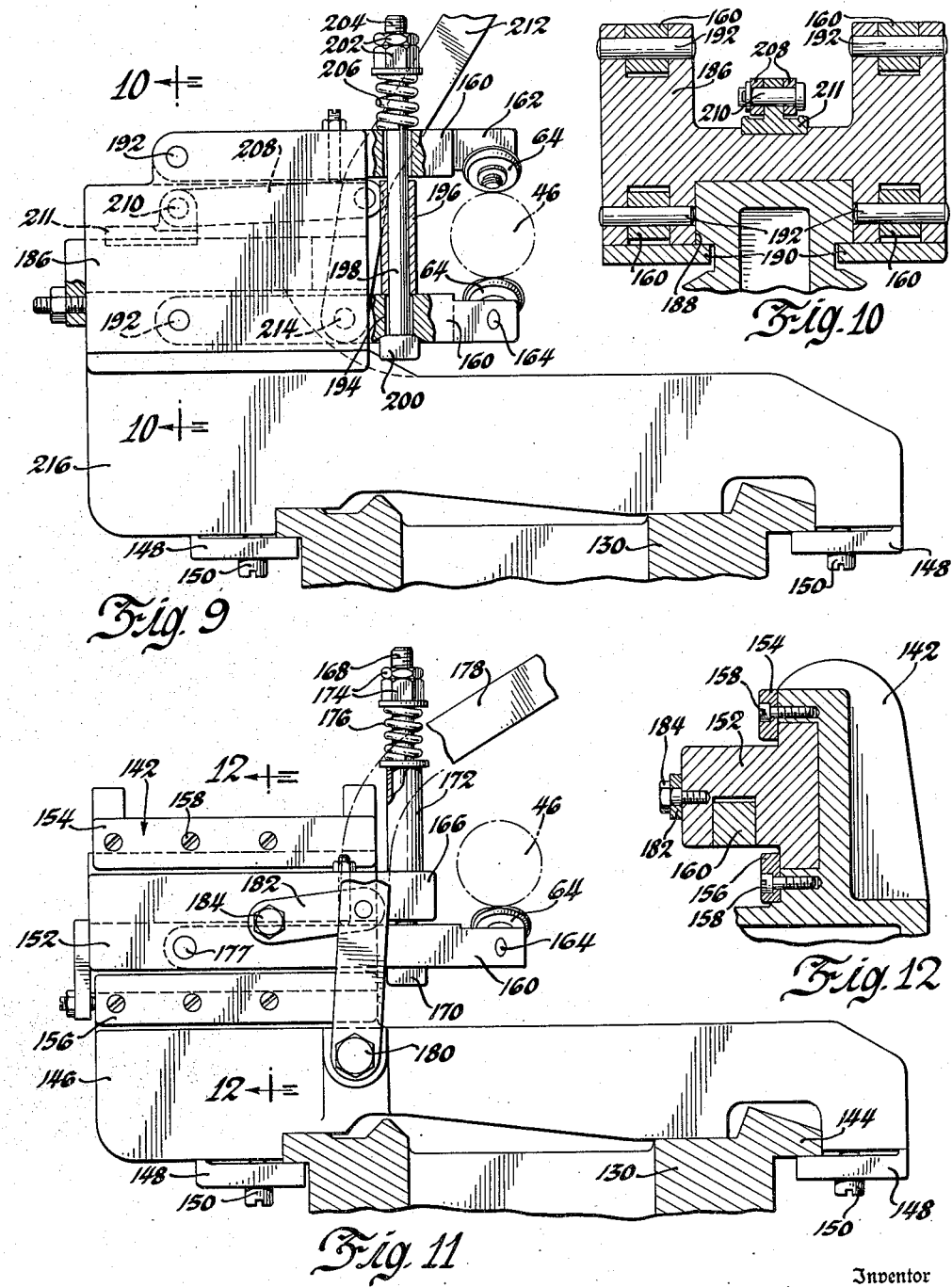

Patented Sept. 5, 1944

2,357,515

UNITED STATES PATENT OFFICE 2,357,515

BEARING FILLET ROLLER

Charles W. Jackman, Flint, Mich., assignor to General Motors Corporation, Detroit, Mich., a corporation of Delaware Application September 2, 1942, Serial No. 457,027

13 Claims. (Cl. 29—90)

This invention relates to crankshafts, axle shafts, etc., which have fillets, bearing grooves or shoulders, and has particular reference to a device or machine and a method of rolling the surface of the fillets adjacent the bearings of the shaft to produce a smooth hardened surface free of scratches.

It is known in the art that failures of crankshafts occur many times because of roughnesses or scratches on the fillets, and it was found by rolling the fillets with hardened rollers, that the surface could be made very smooth and be hardened, or be given a hardened finish similar to that obtained by shot blasting. This hardened, smooth finish eliminates or removes the roughnesses or scratches in the fillets and removes the cause of the crankshaft failures.

In prior practice the fillet radius was produced by a grinding wheel which was suitably dressed, but no fillets were rolled. This grinding process did not leave a surface which was smooth enough. The rolling operation of the instant invention is subsequent and in addition to the grinding process.

The rolling of the fillets is more or less of a burnishing operation, and in order to obtain a satisfactory smooth surface, a quantity of a special light extreme pressure oil is used which may be applied in any suitable way before the commencement of the operation.

The rollers of the invention are mounted on a machine or device so as to be capable of working or operating in the angle formed between the bearing and the cheek of the shaft, and are positioned on substantially the bisector of the angle between a line drawn longitudinally of the shaft on the bearing and a line at right angles thereto substantially in the plane of the face of the cheek of the shaft adjacent the bearing.

It has been found that the speed of the shaft while the rollers are operating is more or less immaterial and a wide range of speeds is possible. In practice it has been found that for about 200 revolutions of the crankshaft with a single roller, enough polish and smoothness is given to the fillet. If two rollers are used, about 100 revolutions only are necessary.

It is also important that the roller speed be non-synchronous with the crankshaft speed so as to distribute the work-roller contact. To this end it is desirable to have the circumference of the bearing such that it is not a multiple of the crcumference of the roller. This difference in the circumference will give a hunting action and insure a proper rolling of the fillet.

It has been found that the rolling of the fillet will increase the fatigue strength of the crankshaft about 25%.

It is also important to use a roller which has a variable width of periphery or surface of contact for the roller. This is desirable in order that all parts of the fillet may be properly rolled or burnished. The periphery or rolling surface of the roller is somewhat of the shape of a sine curve which has been flattened by pulling it out at the two ends.

The specific manner in which the rolling is accomplished is performed by two machines, one of which is used to roll the fillets of the crank throw bearings and the other the fillets of the main bearings of the shaft.

The machine which rolls the crank throw bearings is provided with a master crankshaft, in all respects a duplicate of the shaft having the fillets to be rolled, and on this master crankshaft there are journally mounted duplex carrier arms in a number equal to the crank throws on the shaft. These duplex arms are separable in order to enable one crankshaft to be removed and another shaft put in its place, and adjacent the end of the duplex arms a plurality of rollers are mounted to act on the fillets of the shaft. The master crankshaft is driven, and the interconnection of the duplex carriers with the crankshaft causes the crankshaft to turn in unison and at the same time causes the rollers to roll the fillets of the bearings.

For the main bearings the rollers are mounted on tool holders secured to suitable carriers slidably mounted on a machine. The shaft is suitably mounted in a machine having a headstock and a tailstock with an adjustable pilot. After the shaft is mounted in the machine, the carriages containing the tools having the rollers are moved toward the crankshaft so that the rollers engage with the fillets. The machine is then operated to cause the headstock to rotate the shaft, and this rotation causes the rolling of the fillets due to the bearing or contact of the rollers with the fillets.

On the drawings:

Figure 2 is a side view of the machine of Figure 1.

Figure 3 is an enlarged end view of one of the duplex carriers which hold the rollers.

Figure 4 is a side view of the structure of Figure 3, parts being broken away and shown in section better to illustrate the construction. The released position of the carriers is shown in dotted outline.

Figure 1:
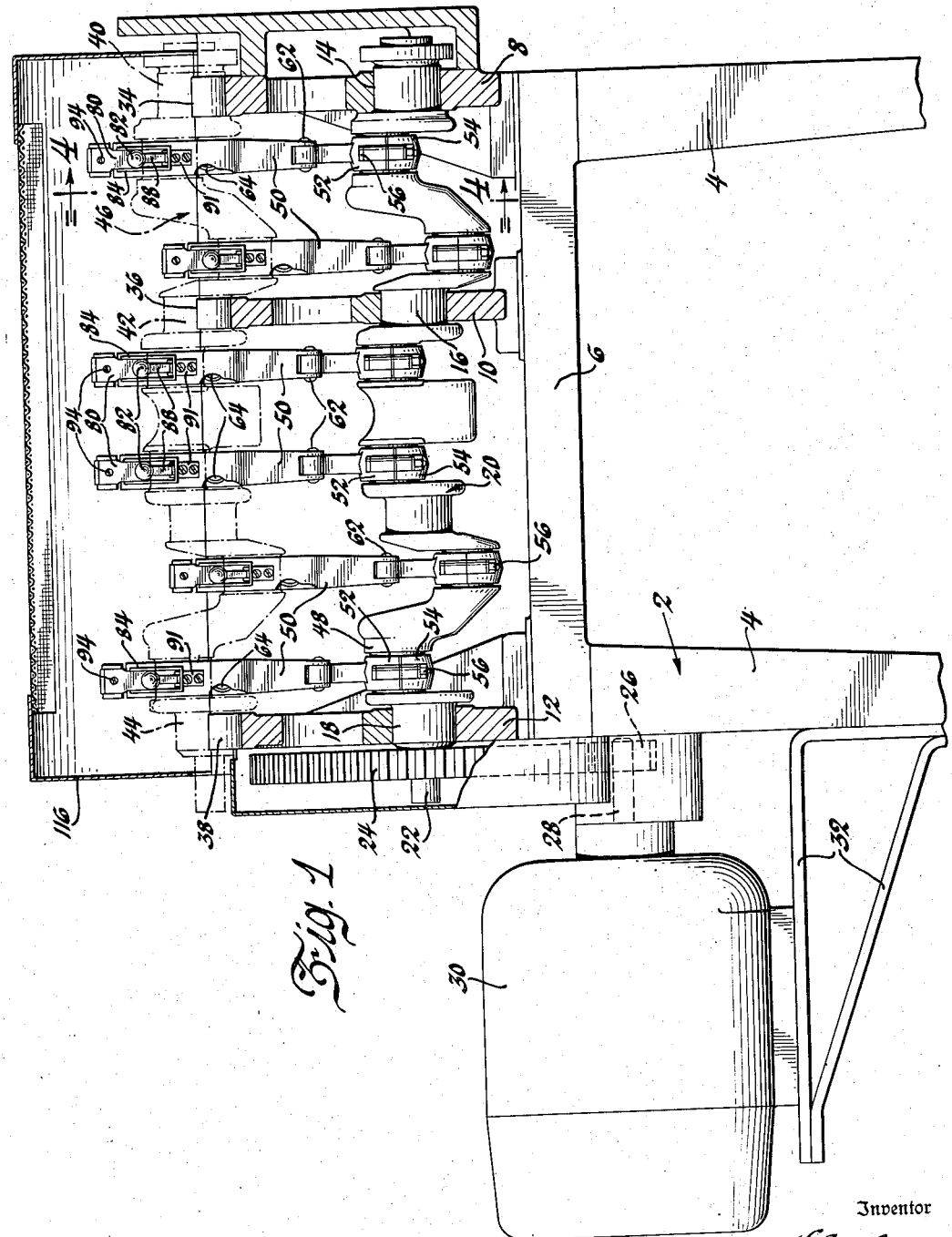
Figure 1 is a side view, with parts broken away and shown in section, showing the machine and mechanism for rolling the fillets on the crank throw bearings.

Figures 5, 6, and 7 are sections on corresponding lines of Figure 4.

Figure 8 is a side elevational view of a machine for rolling the main bearings of the crankshaft.

Figures 9 and 11 are sections on the corresponding lines of Figure 8.

Figure 10 is a section on the line 10—10 of Figure 9.

Figure 12 is a section on the line 12—12 of Figure 11.

Figure 13 is an enlarged plan view of the roller showing the variation in the width of the rolling surface.

Figure 14 is an enlarged view of one of the fillets showing in dotted outline the two extreme positions of the roller.

Figure 15 is a development of the rolling surface of the roller.

Referring to the drawings, the numeral 2 indicates a support or table for mounting the mechanism. The support has the legs 4 and the shelf 6 on which there are mounted the uprights 8, 10, and 12. Each of these uprights has the bearings 14, 16, and 18 to receive the main bearings of a master shaft 20 which is permanently mounted in the bearings 14, 16, and 18. This shaft 20 has the extension 22 to which there is secured a large gear wheel 24 meshing with a smaller gear wheel 26 secured to a shaft 28 of an electric motor 30 mounted on a shelf 32 secured to one of the legs 4.

The uprights 8, 10, and 12 have the upper bearings 34, 36, and 38 in which there are received the main bearings 40, 42, 44 of the crankshaft 46 which has the crankpin fillets which are to be rolled.

The crank throws 48 of the master crankshaft 20 have journaled thereon the duplex carriers 50. Each carrier has a lower bearing half 52 mating with the bearing cap 54 which is secured to the crank throw bearings 48 by means of the usual bolts and nuts 56. The duplex carrier arms are best shown in Figures 3 and 4 and as all are alike the description of one will suffice for all. Each carrier has the main arm 58 and the auxiliary arm 60 pivoted thereto at 62. Each arm extends upwardly from the master crankshaft 20 and the upper parts thereof are shaped to embrace or surround one of the crank throw bearings of the shaft 46. The main arm 58 as well as the secondary arm 60 each has two rollers 64 mounted therein, the detailed mounting of which is shown in Figures 6 and 7. At the top of the arms where they project above the shaft 46 they are united by means of a mechanism indicated as a whole at 66. This mechanism comprises a bolt 68 screwed into the end of the main arm 58 as shown at 70. The bolt 70 has a coil spring 71 therearound and passes through a cross head 72 which is secured at its ends to links 74 and 76. The opposite ends of these links are pivoted to a shaft 78 on which there is rigidly mounted a Z-shaped lever 80, the handle of which is indicated at 82. This Z-shaped lever 80 in turn has pivoted thereto at 90 a bell crank arm 84, one arm 86 of which is normally parallel with the handle 82. A flat spring 88 is secured to the handle 82 and presses against the arm 86 to urge the lever 84 to swing on its pivot 90 mounted on the lever 80. A hook or catch 91, mounted on the auxiliary arm 60, is adapted to engage the edge of the lever 86 as shown in Figure 4 to hold the linkage mechanism 66 in operative position.

The upper arm 92 of the lever 80 is internally screw threaded and provided with the screw 94 which has a pilot 96 at its end. This pilot engages in an indentation 98 in the outer face of the end of the auxiliary arm 60.

Assuming that the parts of the mechanism 66 are in the full line position shown in Figure 4, and the operator wishes to release it to enable the shaft 46 to be removed, he pulls upwardly on the arm 86 to cause the end of the arm to pull away from the hook 91. The mechanism will then be raised upwardly by the handle 82 around the pivot of the cross head 72 which will enable the mechanism to assume the dotted line position shown at the left of Figure 4. The auxiliary arm 60 will fall by gravity and the end will strike against a bar or rod 100 suitably mounted on the machine.

The machine is provided with a suitable bar 122 against which the arm 58 may abut (Figure 4) when the operator has released the mechanism 66 to replace a crankshaft.

When the crankshaft has been removed and a new shaft in place, the operator seizes the handle 82 and swings the parts back to the full line position and causes the pilot 96 to engage in the indentation 98 and by then pressing downwardly on the handle 82 and the arm 86, the end of the arm 86 of the lever 84 will engage under the catch 91. This operation will cause the spring 71 between the crosshead 72 and the end of the arm 58 to be compressed to a predetermined amount tightly to hold the parts together, and firmly to press the rollers 64 against the fillets of the crank throw bearings.

In Figures 4 and 5 there are shown two pins 104 and 106 at the top of the arms 58 and 60. These pins in the operative positon (Figure 4) of the mechanism 66 overlap and abut tightly against each other, but the ends do not extend all the way toward the opposite carrier arm. The abutment of these pins is to compensate for the shear reaction. They balance the pressure of the opposed rollers mounted in the carriers. Where one roller presses in one direction, the opposite roller presses in the other, and these shear pins align the apparatus and compensate for differences in shear.

Referring to Figures 6 and 7, the manner in which the rollers are mounted in the carriers is shown. Each carrier has two rollers; the rollers for the main carrier 58 are shown at the left in Figures 6 and 7, while the rollers shown at the right of the figures are mounted in the carrier 60. The roller 64 in Figure 6 will bear on the fillet F at one side of the bearing while the roller 64 in Figure 7 will bear on the fillet F' at the other side of the bearing. These rollers 64 are mounted in the carriers in a plane which bisects the right angle formed by a line L drawn on the surface of the bearing and a line L' at right angles thereto drawn substantially on the cheek of the throw of the crankshaft adjacent the roller 64. This position of the roller is desirable for the reason that it will roll directly on the fillet from the most favorable angle.

Each carrier arm is provided with a bore forming a bearing 108 in which there is mounted a pin or axle 110 on which a roller 64 is turnably mounted. Each shaft 110 is held in place by means of the pin 112 passing through a bore in the arm 58 or 60 and a corresponding passage in the axle 110. Each arm 58 and 60 is provided with suitable openings 114 for the reception of the rollers 64.

Referring to Figures 1, 2, and 4, a machine is provided with a protecting hood 116 provided with a handle 118 and a pivot 120. By grasping the handle 118 and moving the hood 116 on its pivot, the hood may be moved to full line position shown in Figure 4 to enable the operator of the machine to have access to the carrier arms and to remove a crankshaft and replace it with a new one.

With the parts in the full line position shown in Figure 4, the operator will start the electric motor 30 to cause the master crankshaft 20 to be rotated by means of the gears 24 and 26. The rotation of the master crankshaft 20 will cause the master crank throws 48 to be rotated to cause the carriers 50 to rotate the crankshaft 46. The rotation of the crankshaft 46 with the rollers 64 pressing against the fillets F and F' will cause the fillets to be rolled to smooth and to harden the fillet surfaces.

Referring to Figures 8–12 inclusive, there is shown a machine and mechanism for rolling the fillets of the main bearings of the crankshaft. The machine comprises a suitable table 130 having the legs 132, a headstock 134, and a tailstock 136. The crankshaft 46 is mounted in the machine between the headstock 34 and a pilot 138 of the tailstock 136. This pilot 138 is adjustable by means of a hand wheel 140 so that the pilot may be withdrawn in order to enable the removal of one shaft 46 and its replacement by a new shaft. In the shaft shown there are four main bearings and the fillet on each bearing is rolled by a single roller. The end bearings of the shaft have but a single fillet and for each end bearing there is provided a carriage 142 (Figures 11 and 12) mounted on tracks 144 on the table 130. The carriage base 146 is secured to the tracks 144 by means of the metal strips 148 and the bolts 150.

Each carriage has mounted therein the slidable head 152 held to the carriage 142 by means of the metal retainers 154 and 156 and the bolts 158. Each head 152 has pivotally mounted therein as at 177 tool holder or roller holder 160 which projects toward the machine and has mounted in the end thereof a roller 64. The end of the roller holder 160 is tapered as at 162 and this tapered part has a bore in which there is mounted the axle 164 on which the roller 64 is mounted. The mounting of the roller 64 is the same for all of the tool holders shown in Figures 8–12 inclusive.

The slidable head 152 has a projection 166 which extends over and is spaced from the tool holder 160. The projection 166 and the tool holder 160 have mating openings and through these openings there extends a bolt 168 the head 170 of which is under the tool holder 160. The bolt is surrounded by a sleeve 172, and between the sleeve and a washer and nut assembly 174 on the threaded end of the bolt, a coil spring 176 is mounted. This coil spring is under a definite amount of compression and urges the arm 160 to move on its pivot 177 upwardly (Figure 11) toward the extension 166 which will cause the roller 64 to be urged upwardly and against the fillet of the shaft 46.

An operating lever 178 is pivoted at 180 to the base 146 of the carriage 142 and has pivoted thereto a link 182 pivoted at 184 to the slidable head 152. The movement of the lever 178 to the left (Figure 11) will cause the slidable head 152 and its roller 164 to move away from the crankshaft 46 to enable the crankshaft to be withdrawn and replaced.

There is one slidable head 152 at each end of the crankshaft and the mechanism of this head, as shown in Figures 11 and 12, is identical at both ends except that the parts are right and left as is shown in Figure 8 and there are a few minor immaterial differences in form or shape.

For the two bearings of the shaft but a single slidable head 186 is used, and each head has four tool or roller holders 160. Each roller holder is substantially the same shape except for its being right or left according to the position of the roller, and each roller has one roller 64 mounted in the end thereof. The head 186 is slidably mounted on a way or track 188 and is held on the track by means of the metal strips 190. Each roller holder 160 is pivoted to the head 186 by means of the pins 192.

Each pair of roller holders 160 of Figures 9 and 10 operating on the same bearing are provided with mating openings 194 and are held spaced from each other by means of a sleeve 196. A bolt 198 passes through the openings 194 and the collar 195 and has its head 200 beneath the lower tool holder 160. Between the washer and nut mechanism 202 secured to the threaded end 204 of the bolt and the upper tool holder 160 there is mounted a coil spring 206 under a definite amount of compression. When the parts are in the position shown in Figure 9, this spring will press the tool holders 160 toward each other and cause the rollers 164 to bear firmly on the fillets at the ends of the bearing of the shafts 46.

The slidable head 186 has mounted thereon two similar links 208 pivoted thereto by means of a pin 210 mounted in a hinge member 211 secured to the head 186. These links 208 are pivoted at their other end to an operating lever 212 pivoted at 214 to the base 216 on which the track 188 is formed. By moving the lever 212 to the left (Figure 9) the head 186 will be moved to cause the tool holders 160 and rollers to move away from the shaft to enable the operator to take one shaft out of the machine and replace it with another.

The details of the rollers (all the rollers are alike) and the manner in which they operate on the fillet is disclosed in Figures 13, 14, and 15. Each roller 64 has the lateral extensions 230 which form a bearing therefor and give rigidity to the roller. The roller itself is formed of hardened tool steel and has the wheel part 232 on the periphery of which there is formed the rolling surface 234 which is given a special shape. As is apparent from Figures 13, 14, and 15, the rolling surface 234 varies in width or extent as it passes around the roller. At a point 236 the bearing surface 234 has its narrowest width and at the point 238 it has its broadest width. This increase in width from 236 to 238 comprises a semi-circumference or 180° of the roller. For the other 180° of the roller shown on the opposite side of that seen in Figure 13, the rolling surface 234 decreases in width from the widest part 238 back to its original narrowest point 236, or as shown at 236' in the development of Figure 15. The shape of the surface 234 decreases from 238 to 236, on the side of the roller not seen, in the same way it increases from 236 to 238. This shape of the rolling surface as developed in Figure 15 is more or less the shape of a sine curve. Presuming that we have a normal sine curve, and supposing that the ends could be taken and pulled apart, the sine curve would become very much flattened, and with this flattened curve part 238 will be the highest point or top of the projection, while parts 236 and 236' will be the lowest point or the part commencing and ending respectively at the base line.

This rolling surface 234 is formed by grinding off the side of the roller as indicated at 240 and after the roller has been ground down at its sides the entire periphery will be of a uniform width, or as shown at 236. By suitably grinding down the peripheral edge, or shaping the peripheral surface of the roller, a tapering or varying width or shape such as shown in Figures 13 and 15 is obtained. The radius to the narrowest part 236 is longer than to the widest part 238 because more metal has been removed at the widest part. The radius of the wheel varies substantially constantly between 236 and 238.

The reason for the varying shape and width of the roller will be apparent from an examination of Figure 14. The crankshaft is indicated at 46 and the fillet to be rolled at F or F'. Bearing in mind that Figure 14 is a greatly enlarged view, the narrowest part of the roller is indicated at the dotted line part 236 and the broadest part of the roller is indicated by the dotted line part 238. From an examination of Figures 13 and 14, it is apparent that part 236 projects deeper or farther outward than part 238 and this deeper or greater radius of operation of the roller will roll the center part of the fillet, and as the roller continues to turn, the increasing width of rolling surface 234 and the decreasing radius will cause the rolling surface 234 to roll and to rub outwardly on the fillet surface until the widest part 238 is reached. Therefore, in one rotation of the roller, parts 236 and 238 will contact once with the fillet but as the semi-circumferential parts of the roller from 236 to 238 back to 236' are duplicates of each other, there will be two rubbing contacts against the fillet for each rotation of the roller.

In connection with the difference in circumference of the roller and the bearing having the fillet to be rolled, it is desirable to avoid a 3-2 and 5-3 ratio because an insufficient hunting action is obtained with these ratios. An 8-5 ratio is not to be recommended but the results are not too bad.

Considering Figure 14 and the two points of contact of part 238, it is apparent that the upper part, or where the numeral 238 is applied, is farther away from the center of rotation of the crankshaft than the part adjacent the bearing. The speed of rotation of the crankshaft cheek will therefore be greater than the speed of rotation at the bearing. This difference in speed will cause a slipping action between the working surface of the roller and the fillet at either the bearing end or the crankshaft cheek end. In considering the roller diameter the median plane between the two extremes of the widest part 238, or the plane passing through point 236, is used.

I claim:

1. In a device for rolling the bearing fillets of a crankshaft, roller holding means movable to and from the crankshaft at its bearings, said means being releasable to enable the insertion and removal of the crankshaft, a roller rotatably mounted in said means, the axis of rotation of said roller during its operation being at all times out of parallelism with the bearing and said roller being mounted in a plane forming an angle with the centerline of the bearing, the peripheral part of said roller bearing on the crankshaft fillet, means to cause the roller to be pressed against the fillet, and means to rotate the crankshaft to cause the rotation of the roller and the rolling of the fillet to produce a smooth surface.

2. In a machine for rolling the bearing fillets of a crankshaft, a first roller carrier embracing a crankshaft bearing on one side of the shaft, a second roller carrier embracing the other side of the bearing and cooperating with the first carrier, one or more rollers journally mounted in each carrier, the axis of rotation of each of said rollers during the operation of the rollers being at all times out of parallelism with the bearing and each of said rollers being mounted in a plane forming an angle with the centerline of the bearing, means removably to hold said carriers together to cause the rollers to bear on the fillets, and means to cause the crankshaft to rotate to enable the rollers to roll the fillets and produce a smooth surface.

3. In a device for rolling the bearing fillets of a crankshaft, roller holding means movable to and from the crankshaft at its bearings, said means being releasable to enable the insertion and removal of the crankshaft, a roller mounted in said means, the peripheral part of said roller bearing on the crankshaft fillet, said roller having a peripheral rolling surface of varying width, means to cause the roller to be pressed against the fillet, and means to rotate the crankshaft to cause the rotation of the roller and the rolling of the fillet to produce a smooth surface.

4. In a device for rolling the bearing fillets of a crankshaft, roller holding means movable to and from the crankshaft at its bearings, said means being releasable to enable the insertion and removal of the crankshaft, a roller mounted in said means, the peripheral part of said roller bearing on the crankshaft fillet, said roller being positioned in a plane bisecting the angle formed by a line along the periphery of the bearing and a line at right angles thereto at the bearing end, means to cause the roller to be pressed against the fillet, and means to rotate the crankshaft to cause the rotation of the roller and the rolling of the fillet to produce a smooth surface.

5. In a device for rolling the bearing fillets of a crankshaft, roller holding means movable to and from the crankshaft at its bearings, said means being releasable to enable the insertion and removal of the crankshaft, a plurality of rollers mounted in said means, the peripheral part of said rollers bearing on the crankshaft fillet and said rollers being positioned 180° from each other relative to the bearing, means to cause the rollers to be pressed against the fillet, said rollers having a peripheral rolling surface of varying width, and means to rotate the crankshaft to cause the rotation of the roller and the rolling of the fillet to produce a smooth surface.

6. In a device for rolling the bearing fillets of a crankshaft, roller holding means movable to and from the crankshaft at its bearings, said means being releasable to enable the insertion and removal of the crankshaft, a plurality of rollers mounted in said means, the peripheral part of said rollers bearing on the crankshaft fillet and said rollers being positioned 180° from each other relative to the bearing, means to cause the rollers to be pressed against the fillet, said rollers being positioned in a plane bisecting the angle formed by a line along the periphery of the bearing and a line at right angles thereto at the bearing end, and means to rotate the crankshaft to cause the rotation of the roller and the rolling of the fillet to produce a smooth surface.

7. A roller for rolling and smoothing the bearing fillets of a crankshaft, said roller having a periphery of a circumferentially gradually varying width, said periphery increasing for substantially 180° to its maximum and then decreasing for substantially 180° to its minimum.

8. A roller for rolling and smoothing the bearing fillets of a crankshaft, said roller having a periphery of a circumferentially gradually varying width, said roller having radii of different lengths, the radius of the roller being the longest at the narrowest part of the periphery and the shortest at the widest part.

9. In a device for rolling the bearing fillets of a crankshaft, roller holding means surrounding the crankshaft at its bearing and mounted adjacent thereto, said means comprising a pair of separable hinged members, a plurality of rollers mounted in each member of the pair, said rollers being mounted at an angle to the center line of the crankshaft and bearing on the fillets, means to cause the rollers to be pressed against the fillets, and means to rotate the crankshaft to cause the rotation of the rollers and the rolling of the fillets to produce a smooth surface.

10. The invention of claim 9, the rollers in each member of the pair of hinged members being oppositely inclined.

11. In a machine for rolling the bearing fillets of a crankshaft, a first roller carrier embracing a crankshaft bearing on one side of the shaft, a second roller carrier embracing the other side of the bearing and cooperating with the first carrier, each carrier having two rollers, one roller of each carrier contacting the fillet on one end of the bearing, the other roller contacting the fillet at the other end of the bearing, means removably to hold said carriers together to cause the rollers to bear on the fillets, and means to cause the crankshaft to rotate to enable the rollers to roll the fillets and produce a smooth surface.

12. In a machine for rolling the bearing fillets of a crankshaft, a first roller carrier embracing a crankshaft bearing on one side of the shaft, a second roller carrier embracing the other side of the bearing and cooperating with the first carrier, each carrier having two rollers, the four rollers being positioned 90° apart and two rollers contacting each fillet, means removably to hold said carriers together to cause the rollers to bear on the fillets, and means to cause the crankshaft to rotate to enable the rollers to roll the fillets and produce a smooth surface.

13. In a machine for rolling the bearing fillets of a crankshaft, a first roller carrier embracing a crankshaft bearing on one side of the shaft, a second roller carrier embracing the other side of the bearing and cooperating with the first carrier, said second carrier being pivoted to the first carrier, one or more rollers journally mounted in each carrier, means removably to hold said carriers together to cause the rollers to bear on the fillets, and means to cause the crankshaft to rotate to enable the rollers to roll the fillets and produce a smooth surface.

CHARLES W. JACKMAN.

CERTIFICATE OF CORRECTION.

Patent No. 2,357,515.   September 5, 1944.

CHARLES W. JACKMAN.

It is hereby certified that error appears in the printed specification of the above numbered patent requiring correction as follows: Page 1, first column, line 53, for "crcumference" read --circumference--; page 2, first column, line 28, for "bearings" read --bearing--; page 3, second column, line 11, after "two" insert --center--; and that the said Letters Patent should be read with this correction therein that the same may conform to the record of the case in the Patent Office.

Signed and sealed this 31st day of October, A. D. 1944.

Leslie Frazer (Seal)   Acting Commissioner of Patents.